(No Model.) 2 Sheets—Sheet 1.

G. R. STETSON.
METHOD OF MANUFACTURING TWIST DRILLS.

No. 331,739. Patented Dec. 1, 1885.

WITNESSES.
J. Henry Taylor.
James F. Bligh.

INVENTOR.
Geo. R. Stetson
by Alex. P. Browne.
attorney (No Model.) 2 Sheets—Sheet 2.

G. R. STETSON.
METHOD OF MANUFACTURING TWIST DRILLS.

No. 331,739. Patented Dec. 1, 1885.

UNITED STATES PATENT OFFICE.

GEORGE R. STETSON, OF NEW BEDFORD, MASS., ASSIGNOR TO HIMSELF AND THE MORSE TWIST DRILL AND MACHINE COMPANY, OF SAME PLACE.

METHOD OF MANUFACTURING TWIST-DRILLS.

SPECIFICATION forming part of Letters Patent No. 331,739, dated December 1, 1885.

Application filed May 16, 1885. Serial No. 165,691. (No model.)

*To all whom it may concern:*

Be it known that I, GEORGE R. STETSON, of New Bedford, in the county of Bristol and State of Massachusetts, a citizen of the United States, have invented certain new and useful Improvements in the Art, Process, or Method of Manufacturing Twist-Drills, of which the following is a specification.

My improvement relates to the manufacture of twist-drills, and has for its object to simplify and cheapen the methods of manufacture now in use.

In most of the methods of manufacturing twist-drills now in use the drill is brought to its perfect or final form, as regards the contour of its grooves, by a milling or cutting operation, which of necessity consumes much time and involves a waste of over a third of the stock or metal; and, as regards the contour of the intermediate faces or lands, by what is known as a "clearing" operation, which is also laborious and slow.

A certain amount of the labor and time required and a certain saving of stock has heretofore been obtained in some cases by first rolling a double groove into a heated blank, and then twisting the grooved portion of this heated blank to approximate to the twist in the finished drill, after which the cutting and clearing is performed, as described. By this method, however, as heretofore practiced it has been very difficult to avoid producing a drill which is bent or otherwise imperfect.

Figure 1:
Figure 2:
Figure 3:
Figure 4:
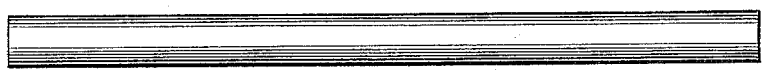
Figure 5:
Figure 6:
Figure 7:
Figure 8:

In the drawings, Figures 1, 2, and 3 represent a drill-blank treated in this way. Fig. 4 represents the blank as it is when the process of grooving and twisting is not followed, and Figs. 5 and 6 represent, respectively, the drill after it is cut and the drill after it is cut and cleared. Figs. 7 and 8 show the drill as formed by my improved process, as will be hereinafter described.

I first take a drill-blank, such as is shown in Fig. 1, which, as will be seen by a comparison with the blank in Fig. 4 and with the finished drill, Figs. 6 and 8, is about two-thirds the length of the finished drill, and I groove and twist this blank, while hot, as shown in Figs. 2 and 3. I then cause the drill-blank while hot to pass between a pair of rolls whose faces are of the right contour to produce the finished drill. A pair of rolls of this character is fully described and illustrated in Letters Patent No. 302,600, granted to me July 19, 1884, and therefore no further description of such rolls need be given here. The drill-blank now has the appearance shown in Fig. 7. The blank is now in condition, after being pointed, to make a serviceable drill, and such a drill is as good as any of those now in use, except that its surface lacks the bright finish which is obtained by the present cutting and clearing process. Therefore, where such a bright finish is desired, I next anneal the drill-blank to thoroughly soften it, and also at the same time to take out any temper that it may have received, and, if required, I remove the scale by vitrioling or any other well-known process, and I then repeat the rolling operation above described upon the drill-blank when cold. This leaves the blank with a bright finish, as shown in Fig. 8. Any irregularity or bend in the twisted blank, Fig. 3, is removed by the rolling, by which also the metal of the blank is thoroughly compacted together, and, by the final rolling, a bright finish is given to the completed drill, which is much more brilliant and attractive than any obtainable by the methods of cutting and clearing heretofore practiced. I also make a material gain, as will be seen, in the amount of time required, thereby materially simplifying and cheapening the work.

I am aware that drills have heretofore been made by cutting and clearing away the metal from a round blank, as shown in Fig. 4, and also by cutting and clearing away the metal from a previously-twisted blank, as shown in Fig. 3; also that it is not broadly new to form a twist-drill or other similar tool by rolling it from a blank, and I therefore make no claim to any of these things, broadly.

I claim—

1. The improved art, method, or process of making twist-drills herein described, the same consisting of the following steps, viz: first, rolling a pair of grooves into the hot blank; second, twisting the hot grooved blank so produced to form, approximately, the twist of the drill; third, rolling the hot grooved and twisted blank substantially as described.

2. The improved art, method, or process of making twist-drills herein described, the same consisting of the following steps, viz: first, rolling a pair of grooves into the hot blank; second, twisting the hot grooved blank so produced to form, approximately, the twist of the drill; third, rolling the hot grooved and twisted blank substantially as described; fourth, annealing the blank so produced, and vitrioling it, if required; fifth, re-rolling this blank while cold, all substantially as herein described.

In testimony whereof I have hereunto subscribed my name this 7th day of May, A. D. 1885.

GEORGE R. STETSON.

Witnesses:
ELIOT D. STETSON,
FRANCIS B. GREENE.